US006727845B2

(12) United States Patent
Burger

(10) Patent No.: US 6,727,845 B2
(45) Date of Patent: Apr. 27, 2004

(54) DEVICE FOR EMITTING HIGH-FREQUENCY SIGNALS

(75) Inventor: Stefan Burger, Lüneburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/204,450

(22) PCT Filed: Feb. 9, 2001

(86) PCT No.: PCT/EP01/01441

§ 371 (c)(1),
(2), (4) Date: Dec. 9, 2002

(87) PCT Pub. No.: WO01/67542

PCT Pub. Date: Sep. 13, 2001

(65) Prior Publication Data

US 2003/0137447 A1 Jul. 24, 2003

(30) Foreign Application Priority Data

Mar. 4, 2000 (DE) ........................................ 100 10 713

(51) Int. Cl.$^{7}$ .......................... G01S 13/08; G01S 7/282

(52) U.S. Cl. ..................... 342/124; 342/175; 73/290 R; 343/772

(58) Field of Search ................................ 342/124, 175; 324/637, 642; 333/252, 113, 21 A, 251, 254, 34, 99 R; 343/703, 720, 753, 772, 786, 872, 878, 888, 890, 900; 73/167, 290 R, 290 V, 32 A

(56) References Cited

U.S. PATENT DOCUMENTS

| | | | |
|---|---|---|---|
| 2,433,074 A | 12/1947 | Tuller | 178/48 |
| 2,909,735 A | 10/1959 | Hessler, Jr. | 333/33 |
| 4,287,496 A | 9/1981 | Young | 333/248 |
| 4,356,493 A | 10/1982 | Bogner | |

(List continued on next page.)

FOREIGN PATENT DOCUMENTS

| | | |
|---|---|---|
| DE | 93 12 251 | 1/1994 |
| DE | 94 12 243 | 11/1994 |
| DE | 44 05 855 A1 | 8/1995 |
| DE | 196 17 963 A1 | 11/1997 |
| DE | 196 29 593 A1 | 1/1998 |
| DE | 197 52 808 A1 | 6/1999 |
| DE | 198 00 306 A1 | 7/1999 |
| EP | 0 231 473 | 8/1987 |
| EP | 0 350 324 A2 | 1/1990 |

OTHER PUBLICATIONS

German Patent Office Search Report in corresponding German Application.
Abstract of Japan No. 60096901.
Input Impedance of Coaxial Line to Circular Waveguide Feed, Deshpande and Das, Nov. 1997.
Rolf Panzke, "Beryhrungslose kontinuierliche Fullstandsmessung mit Mikrowellen," In: Messen & Prufen 26, 1990, H. 4, S. 181–184.
Hans–Jurgen Griem, "Rohrstrahler als Erreger einer Parabolantenne fur das 13–cm–Band.," In: UKW–Berichte Jan. 1976, S. 2–9.

*Primary Examiner*—John B. Sotomayor
(74) *Attorney, Agent, or Firm*—Jones, Tullar & Cooper, P.C.

(57) ABSTRACT

The invention relates to a device for emitting high-frequency signals, comprising a signal generation unit, a signaling line, an emission cable and an antenna configured as a circular waveguide, said antenna being sealed in an end section by a rear wall. According to the invention, the signal generation unit creates the high-frequency signals, the signaling line conducts the high-frequency signals along the emission cable and said emission cable projects into the interior of the antenna and is positioned approximately parallel to the rear wall. The invention aims to provide a device for emitting electromagnetic waves, which is characterized by optimized emission characteristics. To achieve this, the distance (Z) between the emission cable and the rear wall of the antenna is approximately λ/6, whereby λ is the wavelength of the high-frequency signals borne by the antenna.

12 Claims, 2 Drawing Sheets

U.S. PATENT DOCUMENTS 4,641,139 A * 2/1987 Edvardsson ................. 342/124
5,594,449 A 1/1997 Otto ........................... 342/124
5,880,698 A * 3/1999 Burger ....................... 343/772
5,926,080 A * 7/1999 Palan et al. ................. 333/252
6,155,112 A * 12/2000 Eckert et al. ............. 73/290 V
6,202,485 B1 * 3/2001 Wien et al. ............... 73/290 R
6,276,199 B1 * 8/2001 Eckert et al. ............. 73/290 V
6,353,418 B1 * 3/2002 Burger et al. ............... 343/786
6,417,748 B1 * 7/2002 Lopatin et al. ............. 333/252
6,469,676 B1 * 10/2002 Fehrenbach et al. ........ 343/786
6,499,346 B1 * 12/2003 Wien et al. ............... 73/290 R

* cited by examiner

DEVICE FOR EMITTING HIGH-FREQUENCY SIGNALS

FIELD OF THE INVENTION

The invention relates to a device for emitting high-frequency signals, having a signal generation unit, a signal line, an emission cable, and an antenna embodied as a circular waveguide, which is terminated in an end region by a rear wall, wherein the signal generation unit generates the high-frequency signals, and the signal line carries the high-frequency signals to the emission cable of the antenna, and the emission cable protrudes into the circular waveguide and is disposed approximately parallel to the rear wall.

A device of the type described above is used for instance in measuring instruments that determine the fill level of a product in a container by way of the transit time of high-frequency signals. Transit time methods utilize the physical law according to which the transit path is equal to the product of transit time and propagation speed. In the case of fill level measurement, the transit path is twice the distance between the antenna and the surface of the product. The useful echo signal, that is, the signal reflected by the surface of the product, and its transit time are determined from the so-called echo function and from the digitized envelope curve; the envelope curve represents the amplitudes of the echo signals as a function of the distance between the antenna and the surface of the product. The fill level itself is then obtained from the difference between the known spacing between the antenna and the bottom of the container and the spacing, determined by the measurement, between the surface of the product and the antenna.

Typical methods for distance determination by way of the transit time of electromagnetic signals are the pulse radar method and the frequency modulation continuous wave radar (FMCW) method. In the pulse radar method, short microwave pulses are periodically transmitted. In the FMCW method, a continuous microwave is transmitted, which is periodically frequency-modulated linearly, for instance by a sawtooth function. The frequency of the received echo signal, compared to the frequency that the transmitted signal has at the instant it is received has the frequency difference, which depends on the transit time of the echo signal. The frequency difference between the transmitted signal and the received signal, which can be obtained by mixing the two signals and evaluating the Fourier spectrum of the mixed signal, is thus equivalent to the spacing of the reflector, such as the surface of the product, from the antenna. Moreover, the amplitudes of the spectral lines of the frequency spectrum, obtained by Fourier transformation, are equivalent to the echo amplitudes, so that the Fourier spectrum represents the echo function.

The propagation of electromagnetic waves in the signal line and in the antenna obeys the laws of physics that apply to the propagation of electromagnetic waves. Typically, the signal line is a coaxial cable. Via a buncher, the electromagnetic waves are carried from the inner conductor of the coaxial cable to the emission cable of the antenna. The antenna is embodied as either a rectangular or a circular waveguide, and in the region of the fill level measurement, antennas of circular cross section are preferentially used, since they are better suited to being built into the neck. for instance, of a container (tank, silo, etc.) than are antennas of rectangular cross section.

In a coaxial cable, the transversal electromagnetic mode (TEM mode) propagates without dispersion in the ideal case. This TEM mode is therefore especially well suited for transporting wave packets or electromagnetic waves that have a certain bandwidth. Wave packets that propagate by the TEM mode accordingly experience no widening; in the same way, in linear frequency-modulated microwaves, a deviation in linearity is largely avoided.

For directionally emitting electromagnetic waves by means of an antenna, a mode is preferably used whose broadcast characteristic has a pronounced forward lobe. The transversal-electrical basic mode or $TE_{11}$ mode, which is capable of propagation in circular waveguides, has this property. In a rectangular waveguide, the corresponding basic mode is the $TE_{10}$ mode. Depending on the dimensions of the antenna embodied as a waveguide, there is a defined frequency range within which only this basic mode is capable of propagation. Above this frequency range, even higher modes that are not so well suited for directional transmission of microwaves propagate, such as the $TM_{01}$ mode for the circular waveguide or the $TE_{20}$ mode in the rectangular waveguide. While the range of nonambiguity, that is, the range in which only the basic mode is capable of propagation, in a rectangular waveguide is relatively wide, the range of nonambiguity for a circular waveguide is relatively narrow. The likelihood that when broadband signals are input, not only the basic mode but undesired higher modes will also be excited is therefore substantially higher in a circular waveguide than in a rectangular waveguide. One unwanted consequence of the development of different modes is known as ringing. The cause of this ringing is that the individual modes that are capable of propagation in a waveguide have different propagation speeds. This is demonstrated by the fact that the transmission pulse does not drop abruptly but rather slowly loses amplitude. This edge of the bell can cover the echo signal in the measurement range, or overlap with the echo signal, to such an extent that major errors in the measured value occur.

SUMMARY OF THE INVENTION

The object of the invention is to propose a device for emitting electromagnetic waves that is distinguished by an optimized broadcast characteristic.

This object is attained in that the spacing between the emission cable and the rear wall of the antenna is approximately lambda/6, where lambda is the wavelength of the high-frequency signals carried in the waveguide. While until now in the literature the opinion was always expressed that the emission cable must be spaced apart from the rear wall of the antenna by approximately lambda/4, if optimal adaptation and propagation of the electromagnetic waves in the basic mode is to be assured, it has now been demonstrated that with the disposition according to the invention of the emission cable in the circular waveguide, the field components of the $TM_{01}$, mode can largely be mutually compensated for. It has been demonstrated that by the device according to the invention, the frequency range in which only the $TE_{11}$ mode is excited is increased by several hundred megahertz. As a result, it is possible to input transmission signals with a bandwidth of greater than 2 GHz into a circular waveguide without causing the problematic ringing. By means of the device of the invention, the impedance adaptation between the signal line and the antenna can moreover be optimized over a wide frequency range, and optimized adaptation means that as much energy as possible is transmitted from the signal line to the antenna; the proportion of the electromagnetic signals that are reflected because of jumps in impedance in the transmission path is consequently minimal.

The shortened structure of the antenna naturally has multiple favorable effects. This shortened structure is made possible by the fact that according to the invention, the emission cable is at a shortened distance from the rear wall of the antenna, compared to the prior art: On the one hand, the shortening reduces the costs of material; on the other, the shorter structure also reduces the ringing, since the different propagation speeds of the various modes—if they even occur at all anymore—have an effect over a shortened transit distance.

It has also proved to be advantageous to dimension the emission cable as at least half as large as half the diameter of the antenna embodied as a circular waveguide. Mathematically, this can be expressed by the following formula: $L \geqq D/2$, where D characterizes the diameter of the circular waveguide. By means of this dimensioning of the emission cable, the impedance adaptation and the dispersion-free transmission of the electromagnetic waves can be optimized further.

An additional improvement in the transmission performance is attained in that according to an advantageous refinement of the device of the invention, a mushroom transmitter is disposed in the region of the free end of the emission cable.

In an advantageous refinement of the device of the invention, it is proposed that the interior of the antenna be at least partly filled with a dielectric material. This achieves a process separation. A process separation is necessary especially whenever there is a risk that the antenna and in particular the emission cable will come into contact with aggressive materials. The formation of deposits on the emission cable, which would cause a change in the transmission characteristic of the antenna, is naturally prevented as well.

Thus a preferred feature of the device of the invention provides a recess, into which the emission cable protrudes, in the dielectric material.

Preferably, the dielectric material is polytetrafluoroethylene (PTFE) or aluminum trioxide ($Al_2O_3$). It is understood that still other dielectric materials can also be used.

As already noted several times, the device of the invention is preferably used in conjunction with a measuring instrument that ascertains the fill level by way of the transit time of electromagnetic waves.

The invention will be described in further detail in conjunction with the accompanying drawings.

DESCRIPTION OF THE PREFERRED EMBODIMENTS

Figure 1:
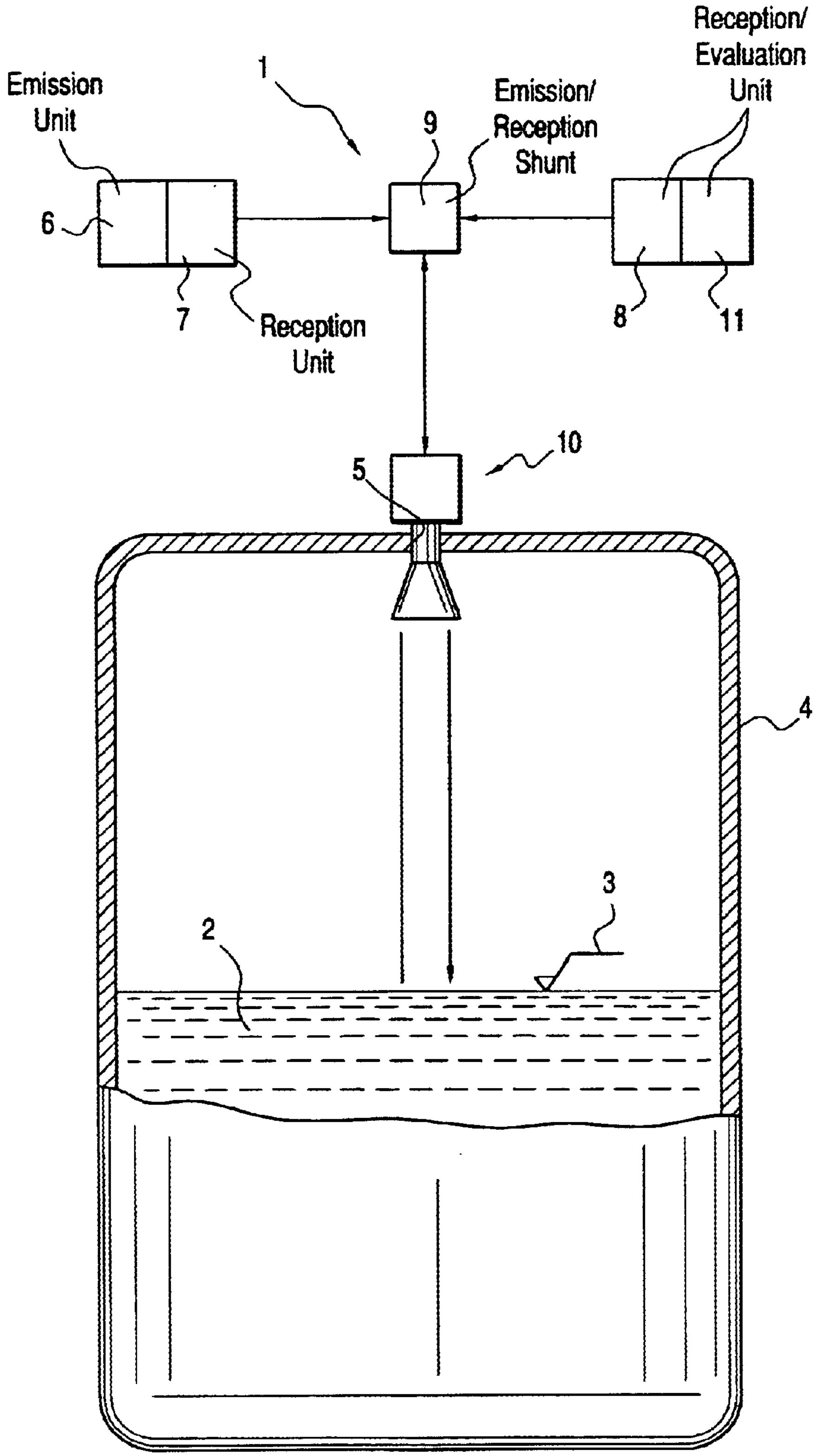
FIG. 1: is a schematic illustration of a measuring instrument that determines the fill level via the transit time of electromagnetic waves.

FIG. 1 shows a schematic illustration of a fill-level measuring instrument 1, which determines the fill level F via the transit time of electromagnetic waves. The electromagnetic waves are preferably microwaves.

A solid or liquid product 2 is stored in the container 4. To determine the fill level F, the fill-level measuring instrument 1 is used, which is mounted in an opening 5 in the cap of the container 4. Via the antenna 10, transmission signals generated in the signal generation and emission unit 6; 7 are broadcast in the direction of the surface 3 of the product 2. At the surface 3, the emitted signals are partly reflected as echo signals. These echo signals are received and evaluated in the reception/evaluation unit 8; 11. By means of the emission/reception shunt 9, the emission unit 6 and the reception unit 7 are decoupled from one another in the example shown. If an emission unit 6 and a separate reception unit 7 are used, then of course the emission/reception shunt 9 can be omitted. From the transit time of the microwaves, the evaluation unit 11 determines the fill level F of the product 2 in the container 4.

Figure 2:
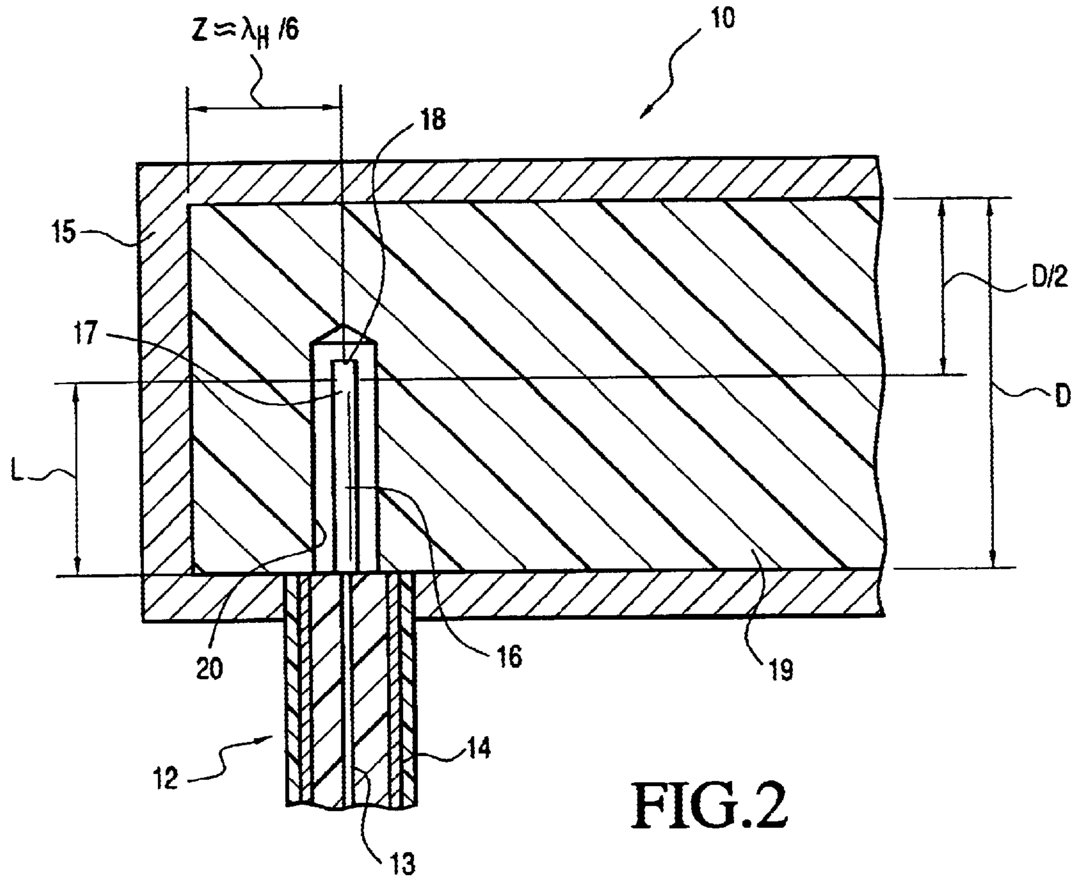
FIG. 2: is a longitudinal section through a preferred embodiment of the device of the invention for emitting high-frequency signals.

In FIG. 2, a longitudinal section is shown through a preferred embodiment of the device of the invention for emitting high-frequency signals. The antenna 10 of the invention is a circular waveguide, whose end region remote from the process by the rear wall 15. The high-frequency broadband signals, which in the normal case are microwaves, are carried over the signal line 12 from the signal generation unit 6 to the emission cable 16 of the antenna 10. The signal line 12 is preferably a coaxial cable, with an inner conductor 13 and an outer conductor 14. The inner conductor 13 is connected to the emission cable 16.

According to the invention, the emission cable 16 has a spacing of approximately lambda/6 from the rear wall 15, where lambda is the wavelength of the high-frequency waves carried in the antenna 10. The emission cable 16 has an approximate length L which is equal to or greater than D/2, where D characterizes the inside diameter of the antenna 10. A mushroom transmitter 18 can be provided on the free end 17 of the emission cable 16.

At least a portion of the interior of the antenna 10 is filled with a dielectric material 19. The emission cable 16 protrudes into a recess 20, preferably a bore, that is provided in the dielectric material.

What is claimed is:

1. A device for emitting high-frequency signals, comprising:

a signal generation and emission unit which generates the high-frequency signals;

a circular waveguide antenna connected to said signal generation and emission unit, said circular waveguide antenna defining a rear wall;

an emission cable which extends into said circular waveguide antenna approximately parallel to said rear wall; and a signal line which carries the high-frequency signals to said emission cable, wherein the spacing between said emission cable and said rear wall is approximately $\lambda/6$, where $\lambda$ is the wavelength of the high-frequency signals.

2. The device as defined in claim 1, wherein said emission cable has a length L which is $L \geqq D/2$, where D is the inside diameter of said circular waveguide antenna.

3. The device as defined in claim 1, wherein said emission cable defines a free end and a mushroom transmitter is disposed at said free end.

4. The device as defined in claim 1, wherein said circular waveguide antenna includes dielectric material which fills up at least the interior of said circular waveguide antenna in the region of said emission cable.

5. The device as defined in claim 4, wherein said dielectric material includes a recess into which said emission cable extends.

6. The device as defined in claim 4, wherein said dielectric material is one of: polytetrafluoroethylene (PTFE) and aluminum troxide ($Al_2O_3$).

7. A fill-level measuring instrument including a device for emitting high-frequency signals, comprising: a signal generation and emission unit which generates the high-frequency signals; a circular waveguide antenna connected to said signal generation and emission unit, said circular waveguide antenna defining a rear wall; an emission cable which extends into said circular waveguide antenna approximately parallel to said rear wall; and a signal line which carries the high-frequency signals to said emission cable, wherein the spacing between said emission cable and said rear wall is approximately $\lambda/6$, where $\lambda$ is the wavelength of the high-frequency signals.

8. The device as defined in claim 7, wherein said emission cable has a length L which is $L \geqq D/2$, where D is the inside diameter of said circular waveguide antenna.

9. The device as defined in claim 7, wherein said emission cable defines a free end and a mushroom transmitter is disposed at said free end.

10. The device as defined in claim 7, wherein said circular waveguide antenna includes dielectric material which fills up at least the interior of said circular waveguide antenna in the region of said emission cable.

11. The device as defined in claim 10, wherein said dielectric material includes a recess into which said emission cable extends.

12. The device as defined in claim 10, wherein said dielectric material is one of: polytetrafluoroethylene (PTFE) and aluminum trioxide ($Al_2O_3$).

* * * * *